United States Patent
Park et al.

(10) Patent No.: US 8,369,283 B2
(45) Date of Patent: Feb. 5, 2013

(54) METHOD FOR REDUCING HANDOVER LATENCY

(75) Inventors: Kyu Jin Park, Seoul (KR); Jae Hoon Chung, Yongin-Si (KR); Han Gyu Cho, Seoul (KR); Eun Jong Lee, Yongin-Si (KR); Doo Hyun Sung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 12/863,288

(22) PCT Filed: Jan. 28, 2009

(86) PCT No.: PCT/KR2009/000398
§ 371 (c)(1),
(2), (4) Date: Jul. 16, 2010

(87) PCT Pub. No.: WO2009/093878
PCT Pub. Date: Jul. 30, 2009

(65) Prior Publication Data
US 2011/0044287 A1 Feb. 24, 2011

Related U.S. Application Data

(60) Provisional application No. 61/023,435, filed on Jan. 25, 2008, provisional application No. 61/025,824, filed on Feb. 4, 2008.

(30) Foreign Application Priority Data

Jan. 19, 2009 (KR) .................. 10-2009-0004274

(51) Int. Cl.
*H04L 12/28* (2006.01)
*H04Q 7/38* (2006.01)
*H04Q 7/20* (2006.01)

(52) U.S. Cl. ........ 370/331; 370/329; 370/401; 455/436; 455/439

(58) Field of Classification Search .......... 370/329–466; 455/67.11–446
See application file for complete search history.

(56) References Cited

U.S. PATENT DOCUMENTS

| | | |
|---|---|---|
| 2005/0192011 A1 | 9/2005 | Hong et al. |
| 2005/0250498 A1 | 11/2005 | Lim et al. |
| 2006/0079235 A1 * | 4/2006 | Kim .............................. 455/439 |
| 2009/0131056 A1 * | 5/2009 | Bontu et al. .................. 455/436 |

FOREIGN PATENT DOCUMENTS

| | | |
|---|---|---|
| CN | 1870818 A | 11/2006 |
| EP | 1 594 334 A1 | 11/2005 |
| KR | 10-2005-0052124 A | 6/2005 |
| KR | 10-2005-0107253 A | 11/2005 |
| WO | WO 2005/078966 A1 | 8/2005 |

* cited by examiner

*Primary Examiner* — Afsar M. Qureshi
(74) *Attorney, Agent, or Firm* — McKenna Long & Aldridge LLP

(57) ABSTRACT

The present invention relates to a handover procedure, and more particularly, to a method of reducing latency in performing handover using fast ranging. The present invention includes the steps of receiving a handover message including a specific ranging code and uplink resource information from a serving base station and transmitting the specific ranging code to a target base station using the uplink information.

15 Claims, 14 Drawing Sheets

METHOD FOR REDUCING HANDOVER LATENCY

This application is a national phase application based on International Application No. PCT/KR2009/000398, filed on Jan. 28, 2009, which claims priority to U.S. Provisional Application No. 61/023,435, filed on Jan. 25, 2008, U.S. Provisional Application No. 61/025,824, filed on Feb. 4, 2008 and Korean Patent Application No. 10-2009-0004274, filed on Jan. 19, 2009, all of which are incorporated by reference for all purposes as if fully set forth herein.

TECHNICAL FIELD

The present invention relates to a handover procedure, and more particularly, to a method of reducing latency in performing handover using fast ranging.

BACKGROUND ART

Generally, in IEEE 802.16 based wireless mobile communication system, a mobile station basically performs handover ranging for synchronization with a target base station. Yet, in order to selectively minimize handover latency, it may directly send a ranging request (RNG-REQ) message by omitting a process for matching uplink synchronization through transmission of CDMA ranging code. This is called fast ranging.

FIG. 1 is a flowchart of signals for a handover process using fast ranging according to a related art.

Referring to FIG. 1, a mobile station sends a handover request (MOB_MSHO-REQ) message to a serving base station (SBS: serving BS) [S110]. The serving base station transmits a handover request HO-REQ to a target base station (TBS: target BS) [S120] and then receives a handover response (HO-RSP) from the target base station [s130].

The serving base station informs the mobile station of a time for transmitting fast ranging information elements (Fast_Ranging_IE) of target base stations using an action time field of a handover response (MOB_BSHO-RSP) [S140].

Thus, if a non-zero time is assigned through the action time field, the mobile station may perform fast ranging on the target base station after the assigned time. Therefore, the mobile station may transmit a handover indication (MOB_HO_IND) message to the serving base station [S150].

Subsequently, the mobile station successfully receives a fast ranging information element (Fast_Ranging_IE) without additional setup, and is then able to receive uplink (UL) allocation for transmitting a ranging request (RNG-REQ) [S160].

Meanwhile, the serving base station calculates the above-mentioned action time using a handover (HO) readiness timer and a base station (BS) switching timer. In this case, the mobile station may estimate time alignment (hereinafter abbreviated TA) information using an uplink resource parameter with the serving base station, a preamble reception time difference between the serving base station and the target base station and the like.

The mobile station finally transmits a ranging request (RNG-REQ) to the target base station using the estimated TA information [S170]. If the mobile station receives a ranging response (RNG-RSP) from the target base station [S180], the mobile station may perform communication with the target base station on user data.

The above-described fast ranging procedure is performed while the mobile station receives necessary ranging parameters through a pre-scanning process and a neighbor advertisement (MOB_NBR-ADV) message receiving process.

FIG. 2 is a flowchart of signals for an initial ranging process in case that the fast ranging shown in FIG. 1 fails.

Referring to FIG. 2, a mobile station sends a handover request (MOB_MSHO-REQ) message to a serving base station [S210]. The serving base station transmits a handover request (HO-REQ) to a target base station [S220] and then receives a handover response (HO-RSP) from the target base station [S230].

The serving base station informs the mobile station of a time for transmitting fast ranging information elements (Fast_Ranging_IE) of target base stations using an action time field of a handover response (MOB_BSHO-RSP) [S240]. Accordingly, the mobile station transmits a handover indication (MOB_HO_IND) message to the serving base station [S250]. Subsequently, the mobile station successfully receives a fast ranging information element (Fast_Ranging_IE) without additional setup [S260] and is then able to receive uplink (UL) allocation for transmitting a ranging request (RNG-REQ).

If the ranging request (RNG-REQ) or ranging response (RNG-RSP) message is lost in the course of performing the fast ranging [S271], as shown in FIG. 2, the mobile station should perform initial ranging with CDMA code instead of performing the fast ranging [S272, S273, S274, S280]. From FIG. 2, it can be observed that latency of 50 ms may be generated from this process.

If a mobile station fails to correctly transmit/receive a message to/from a target base station, ranging parameters may be regarded as set not to be matched. Therefore, the ranging parameters need to be reset through initial ranging. The loss of the ranging request (RNG-REQ) or the ranging response (RNG-RSP) is generated if time synchronization or time alignment (TA) is considerably mismatched or channel estimation between the mobile station and the target base station is mismatched (e.g., a power control is mismatched). Since mobile stations performing handover are mostly located at cell edge, the possibility of the message loss is very high. And, this may raise the corresponding handover latency and may cause ongoing problems.

Yet, IEEE 802.16m system requires handover latency within 30 ms.

FIG. 3 is a diagram for handover latency in case that fast ranging shown in FIG. 1 is successful.

FIG. 3 shows an example of an optimized handover scenario using fast ranging based on a frame structure currently proposed by IEEE 802.16m system. This scenario indicates a situation after a mobile station has sent a last handover indication (MOB_HO-IND) message to a serving base station. In this case, as there is no loss of ranging request (RNG-REQ) or ranging response (RNG-RSP), handover latency of 25 ms is generated.

FIG. 4 is a diagram for handover latency in case that the fast ranging shown in FIG. 2 fails.

A scenario shown in FIG. 4 indicates a situation after a mobile station has sent a last handover indication (MOB_HO-IND) message to a serving base station.

Referring to FIG. 4, in case that loss of ranging request (RNG-REQ) or ranging response (RNG-RSP) is generated, CDMA-based initial ranging should be performed. In this case, as handover latency of 60 ms including a timer T3 is added, total 80 ms handover (HO) interruption time may be generated. For a continuously moving mobile station, propagation delay and time synchronization or power readjustment with a serving or target base station are necessary. In particular, TA mismatch or improper power may bring a loss of a control message and my cause considerably latency in performing fast ranging.

DISCLOSURE OF THE INVENTION

Technical Problem

However, to cope with the above-mentioned situations, control messages relevant to handover should be exchanged between a mobile station and a base station without losses. Even if theses messages are lost or damaged, they should be restorably delivered between the mobile station and the base station.

And, a mobile station or base station quickly needs to recognize a situation that a control message is not normally delivered in the course of handover and should perform a proper procedure.

Moreover, a scheme of allocating an uplink resource to a UL-MAP, which may be known in public to all mobile stations, has a security problem. In particular, authentication via code without an authentication key included therein may cause a security problem.

Accordingly, the present invention is directed to a method of reducing latency that substantially obviates one or more of the problems due to limitations and disadvantages of the related art.

An object of the present invention is to provide a method of performing handover in a mobile station, by which latency can be reduced in performing the handover using fast ranging.

Another object of the present invention is to provide a method of performing handover, by which a security problem of authentication through code without an authentication key included therein can be solved.

Technical Solution

To achieve these objects and other advantages and in accordance with the purpose of the present invention, as embodied and broadly described, a method of performing handover, which is performed by a mobile station, according to the present invention includes the steps of receiving a handover message including a specific ranging code and uplink resource information from a serving base station and transmitting the specific ranging code to a target base station using the uplink information.

Preferably, the specific ranging code and the uplink resource are allocated for the mobile station only by the target base station.

Preferably, the uplink resource information includes at least one selected from the group comprising time information and frequency information on an uplink resource required for the mobile station to transmit the specific ranging code to the target base station.

More preferable, the step of transmitting the specific ranging code to the target base station from the mobile station is performed in a frame indicated by an action time field included in the handover message.

To further achieve these objects and other advantages and in accordance with the purpose of the present invention, a method of supporting handover of a mobile station, which is performed by a serving base station, according to the present invention includes the steps of transmitting a handover request (HO-REQ) to at least one target base station, receiving a handover response (HO-RSP) including a specific ranging code and uplink resource information from the at least one target base station, and transmitting a handover message including the specific ranging code and the uplink resource information to the mobile station.

To further achieve these and other advantages and in accordance with the purpose of the present invention, a method of performing handover, which is performed by a mobile station, according to the present invention includes the steps of receiving a handover message including information required for dedicated ranging and fast ranging information element (Fast_Ranging_IE) from a serving base station and transmitting a dedicated ranging code and a ranging request message for fast ranging to a target base station.

Preferably, the method further includes the step of if the target base station determines that the ranging request message is not received due to channel error as a result of receiving the dedicated ranging code and if non-acknowledgement (NACK) is received from the target base station, retransmitting a ranging request message to the target base station.

Preferably, the method further includes the steps of if the target base station determines that the ranging request message is not received due to error of TA (time alignment) information as a result of receiving the dedicated ranging code, receiving a ranging response message including uplink parameter amendment information from the target base station, amending an uplink parameter using the uplink parameter amendment information, and retransmitting a ranging request message to the target base station.

To further achieve these and other advantages and in accordance with the purpose of the present invention, a method of supporting handover of a mobile station, which is performed by a serving base station, according to the present invention includes the steps of transmitting a handover request (HO-REQ) to at least one target base station, receiving a handover response (HO-RSP) including information required for dedicated ranging and fast ranging information element (Fast_Ranging_IE) from the at least one target base station, and transmitting a handover message including the information required for the dedicated ranging and the fast ranging information element (Fast_Ranging_IE) to the mobile station.

To further achieve these and other advantages and in accordance with the purpose of the present invention, a method of performing handover, which is performed by a mobile station, according to the present invention includes the steps of receiving a handover message including timing information for receiving information required for dedicated ranging and fast ranging information element (Fast_Ranging_IE) from a target base station from a serving base station, transmitting a handover indication (HO-IND) message for the target base station to the serving base station and receiving the information required for the dedicated ranging and the fast ranging information element (Fast_Ranging_IE) from the target base station using the received timing information, and transmitting a dedicated ranging code for the dedicated ranging and a ranging request message for fast ranging to the target base station.

Preferably, the timing information for receiving the information required for the dedicated ranging and the fast ranging information element (Fast_Ranging_IE) is transmitted to the mobile station using an action time field of the handover message.

Preferably, the information required for the dedicated ranging includes at least one selected from the group comprising a dedicated ranging code index, a transmission opportunity and a frame timing for allocating a dedicated ranging region to an uplink of the target base station.

Preferably, the method further includes the step of if the target base station determines that the ranging request message is not received due to channel error as a result of receiving the dedicated ranging code and if non-acknowledgement (NACK) is received from the target base station, retransmitting a ranging request message to the target base station.

Preferably, the method further includes the steps of if the target base station determines that the ranging request message is not received due to error of TA (time alignment) information as a result of receiving the dedicated ranging code, receiving a ranging response message including uplink parameter amendment information from the target base station, amending an uplink parameter using the ranging response message, and retransmitting a ranging request message to the target base station.

To further achieve these and other advantages and in accordance with the purpose of the present invention, a method of supporting handover of a mobile station, which is performed by a serving base station, according to the present invention includes the steps of transmitting a handover request (HO-REQ) to at least one target base station, receiving a handover response (HO-RSP) including timing information for receiving information required for dedicated ranging and fast ranging information element (Fast_Ranging_IE) from the at least one target base station from the at least one target base station, transmitting a handover message including the timing information the mobile station, and if a handover indication for one selected by the mobile station from the group of the at least one target base station is received from the mobile station, informing the selected target base station of the handover of the mobile station.

In the above embodiments, the handover message can include either a handover response message (MOB_BSHO-RSP) of the serving base station for a handover request message of the mobile station or a handover request message (MOB_BSHO-REQ) of the serving base station for the mobile station.

Advantageous Effects

Accordingly, the present invention provides the following effects or advantages.

According to one embodiment of the present invention, a mobile station may receive a specific ranging code and uplink resource allocation information from a target base station via a handover request message or a handover response message. Therefore, the target base station may recognize handover of the mobile station irrespective of accuracy of TA (time alignment) information estimated by the mobile station. And, the present invention prevents an additional delay that may be generated in case of failure of the mobile station in authentication via the ranging request message. Moreover, the present invention may solve a security problem.

According to another embodiment of the present invention, a mobile station performs dedicated ranging together with fast ranging, whereby a delay due to collision of ranging codes can be prevented. Moreover, in case of application of hybrid automatic retransmission request (HARQ) regarding a success or failure in reception of a ranging request message, operation can be adaptively performed by discriminating a channel error and a TA error from each other. Therefore, the present invention may minimize latency.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR INVENTION

Figure 1:
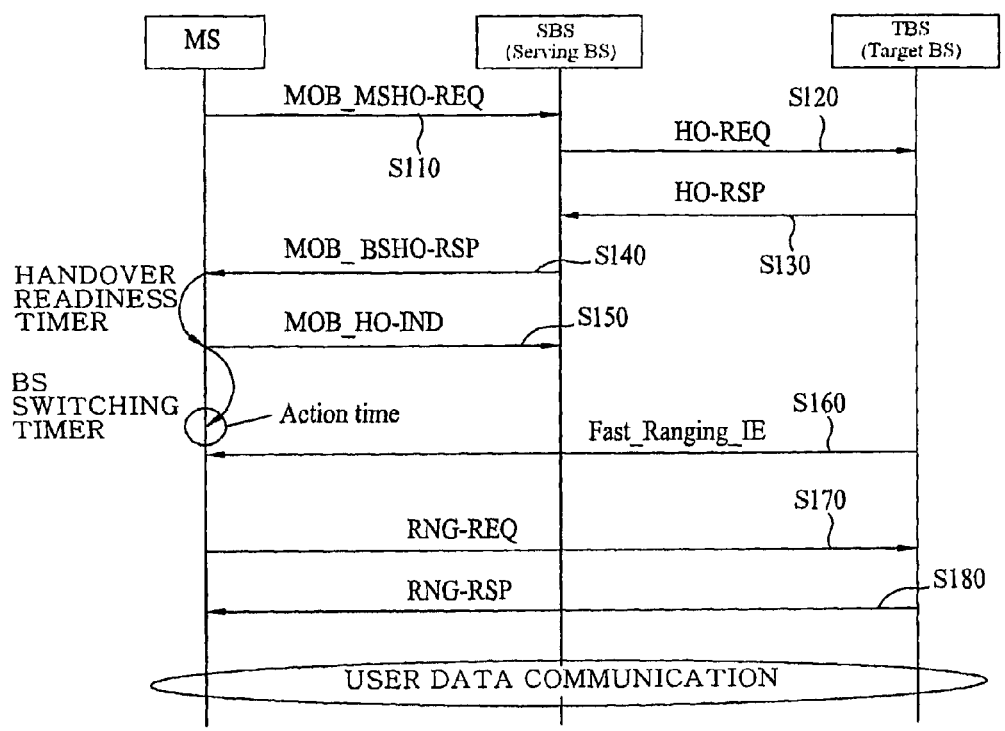
FIG. 1 is a flowchart of signals for a handover process using fast ranging according to a related art.
Figure 2:
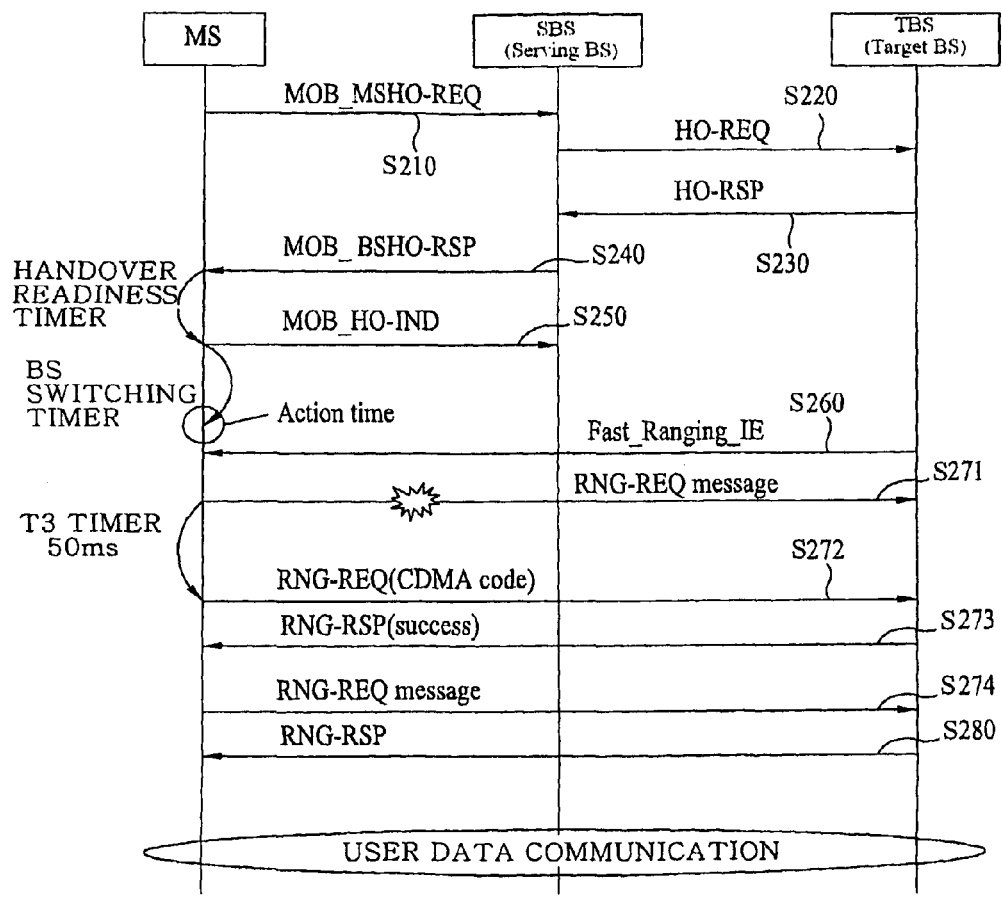
FIG. 2 is a flowchart of signals for an initial ranging process in case that the fast ranging shown in FIG. 1 fails.
Figure 3:
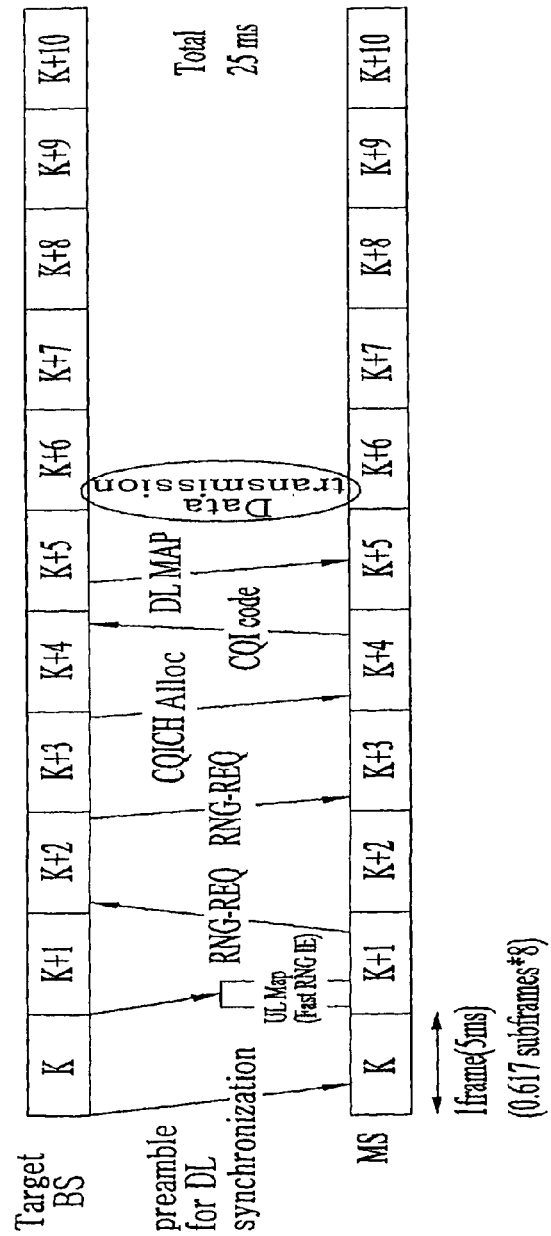
FIG. 3 is a diagram for handover latency in case that fast ranging shown in FIG. 1 is successful.
Figure 4:
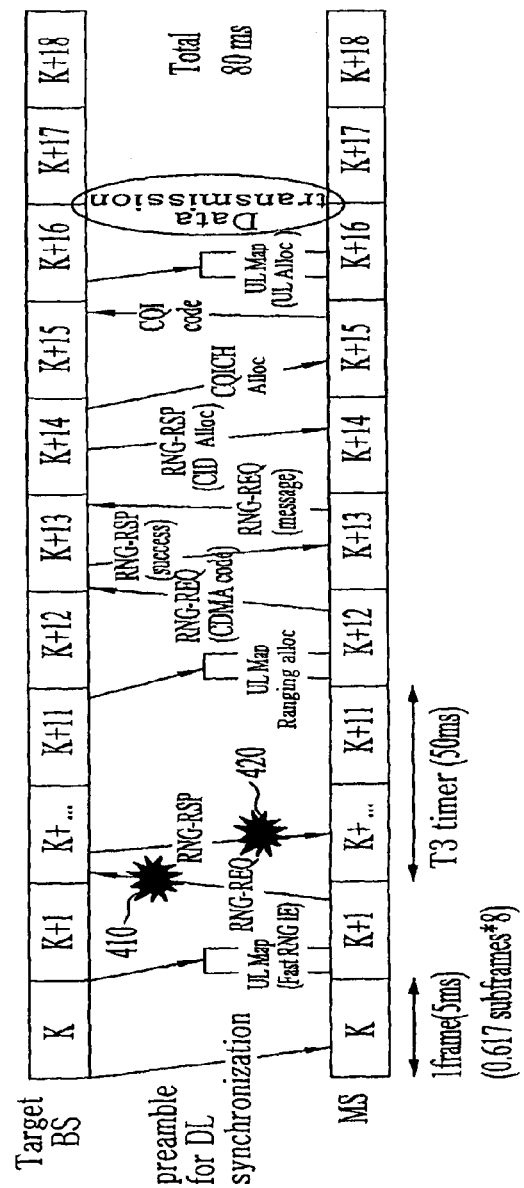
FIG. 4 is a diagram for handover latency in case that the fast ranging shown in FIG. 2 fails.

Reference will now be made in detail to the preferred embodiments of the present invention, examples of which are illustrated in the accompanying drawings.

First of all, the following embodiments correspond to combinations of elements and features of the present invention in prescribed forms. And, it may consider that the respective elements or features are selective unless they are explicitly mentioned. Each of the elements or features can be implemented in a form failing to be combined with other elements or features. Moreover, it may implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this disclosure, embodiments of the present invention are described centering on the data transmission/reception relations between a base station and a mobile station. In this case, the base station is meaningful as a mobile station node of a network which directly performs communication with the mobile station. In this disclosure, a specific operation explained as performed by a base station can be performed by an upper node of the base station in some cases.

In particular, in a network constructed with a plurality of network nodes including a base station, it is apparent that various operations performed for communication with a mobile station can be performed by a base station or other networks except the base station. In this case, 'base station' can be replaced by such a terminology as a fixed station, a Node B, an eNode B (eNB), an access point and the like. And, 'mobile station' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs 9digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

In the following description, specific terminologies are provided to help the understanding of the present invention. And, the use of the specific terminology can be modified into another form within the scope of the technical idea of the present invention.

First Embodiment

A first embodiment of the present invention provides a method of transmitting a specific ranging code to a target base station instead of a handover request message when a mobile station performs fast handover.

Figure 5A:
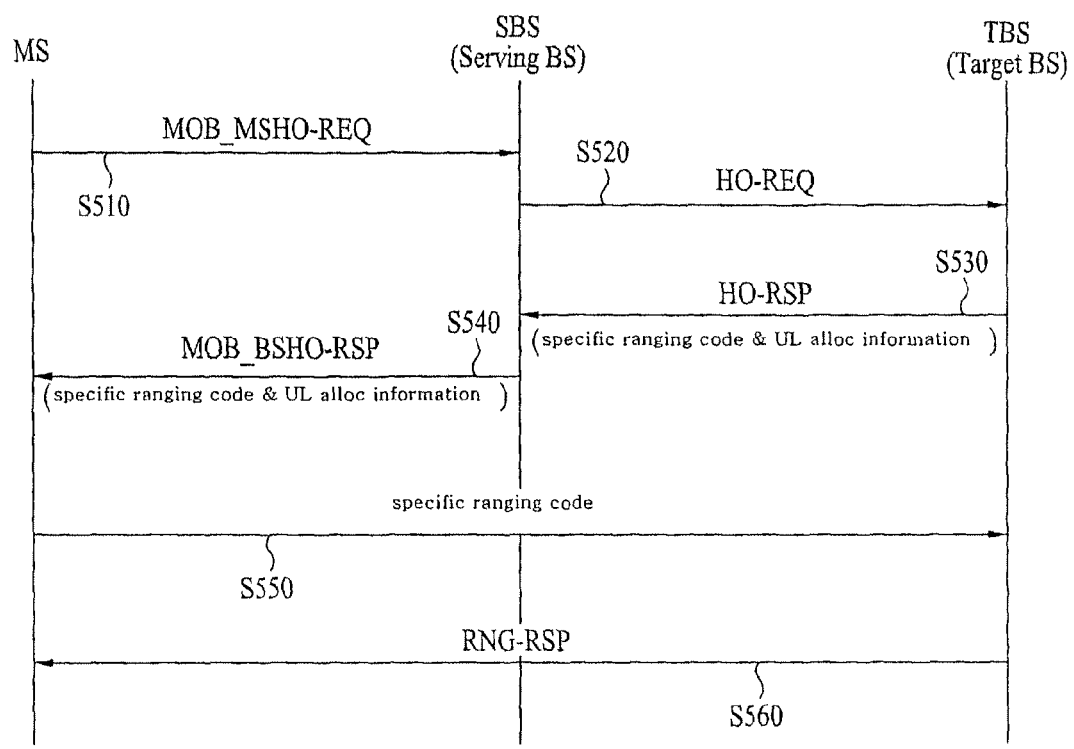
FIG. 5A and FIG. 5B are flowcharts for a fast handover procedure of a mobile station according to a first embodiment of the present invention.

FIG. 5A is a flowchart for a fast handover procedure by a handover request of a mobile station (MS-initiated) according to a first embodiment of the present invention.

Referring to FIG. 5A, a mobile station may transmit a handover request message (MOB_MSHO-REQ) to a serving base station [S510].

Accordingly, the serving base station may exchange information on handover with at least one or more target base stations via backbone network. In particular, the serving base station may transmit a handover request (HO-REQ) message to the at least one target base station [S520].

Having received the request message, the target base station may transmit a specific ranging code and uplink resource information, which will be used for the handover of the mobile station, to the serving base station in a manner of sending a handover response message (HO-RSP) including the specific ranging code and the uplink resource information [S530].

In this case, the uplink resource information can contain information on uplink resources required for the mobile station to transmit the specific ranging code to the target base station. The information on the uplink resources includes uplink subchannel and symbol (OFDM symbol) information and the like.

Subsequently, the serving base station may transmit the specific ranging code and uplink resource information, which were received from the target base station, to the mobile station via a handover response message (MOB_BSHO-RSP) [S540].

The mobile station may transmit the specific ranging code to the target base station using the received uplink resource information, in a frame specified via an action time field contained in the handover response message [S550]. In particular, the mobile station receives an allocation of the uplink resource for transmitting the specific ranging code to the target base station from the serving base station in performing fast handover in advance instead of receiving the allocation via UL-MAP.

As mentioned in the foregoing description, the action time field plays a role in announcing a time for fast ranging information element (Fast_Ranging_IE) to be transmitted to the mobile station from the target base station. Yet, the mobile station has already received the uplink resource information from the serving base station and may utilize the action time field differently. In particular, the information on the time for allocating the fast ranging information element (Fast_Ranging_IE) is not transmitted via the action field. Instead, the information on the time enabling the mobile station to transmit the specific ranging code to the target base station is transmitted.

Meanwhile, in order to receive the specific ranging code for the mobile station to perform handover, the target base station does not allocate the above-allocated uplink resource to other purposes. Moreover, the target base station does not indicate that a specific uplink resource has been allocated to the handover mobile station via UL-MAP. Thus, the mobile station transmits the specific ranging code to the target base station using the specific uplink resource. The target base station is then able to authenticate the handover of the mobile station by detecting the received code through a correlator.

Therefore, the present embodiment is able to solve the related art problem of a transmission failure of a ranging request message (RNG-REQ) which may happen due to inaccurate TA information estimated for a transmission of the ranging request (RNG-REQ) message by a mobile station.

Moreover, by allocating a specific code and uplink resource in direct via MAC message to avoid UL-MAP possibly known in public to all mobile stations, the present embodiment is able to solve a security problem of the related art authentication via code failing to have an authentication key included therein only.

The present embodiment is applicable to fast handover according to a request made not by a mobile station but by a base station (BS-initiated). This is explained in detail with reference to FIG. 5B.

Figure 5B:
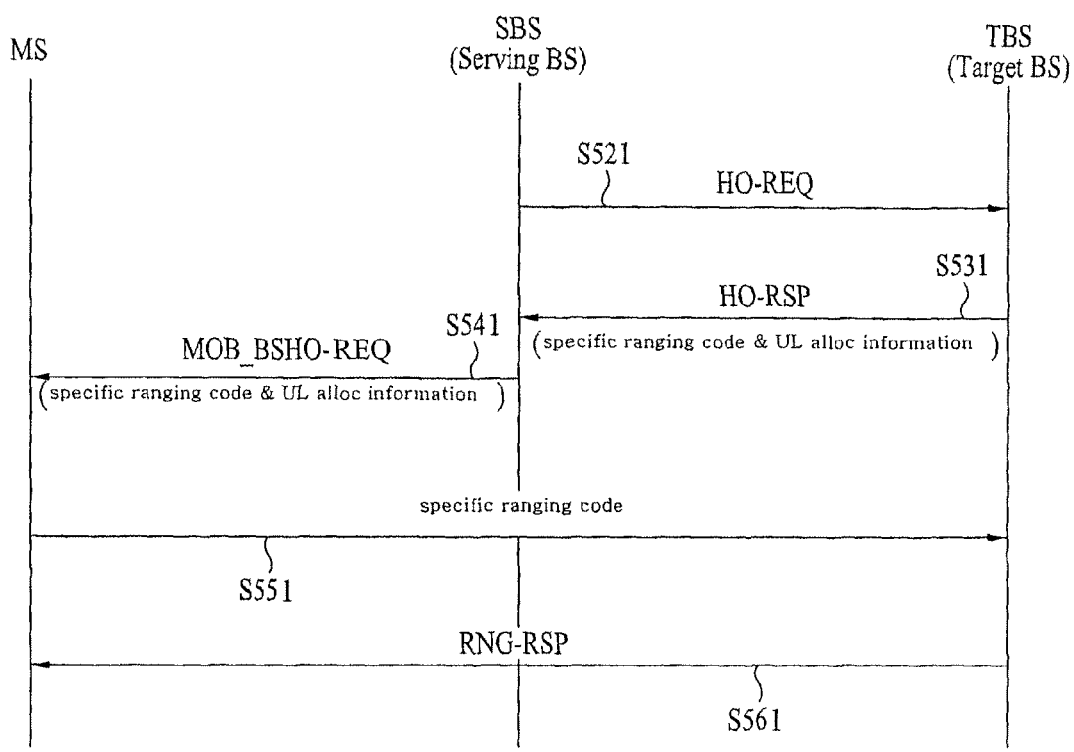

FIG. 5B is a flowchart for a fast handover procedure by a handover request of a base station (BS-initiated) according to a first embodiment of the present invention.

This handover differs from the former fast handover by a request of a mobile station in that a specific ranging code and uplink resource information for carrying the specific ranging code is transmitted to a mobile station not via a handover response message (MOB_BSHO-RSP) from a serving base station but via a handover request message (MOB_BSHO-REQ).

Moreover, a handover procedure is initiated by a request made by a base station. Therefore, this differs in omitting the step S510 of transceiving a handover request message (MOB_MSHO-REQ) of a mobile station prior to the step S521.

Second Embodiment

A second embodiment of the present invention provides a method of performing dedicated ranging together with fast handover performed by a mobile station.

In this case, the dedicated ranging means a method of performing ranging without collision of codes using a dedicated code granted to a mobile station by a target base station instead of performing the general contention-based ranging, when the mobile station performs ranging.

Figure 6A:
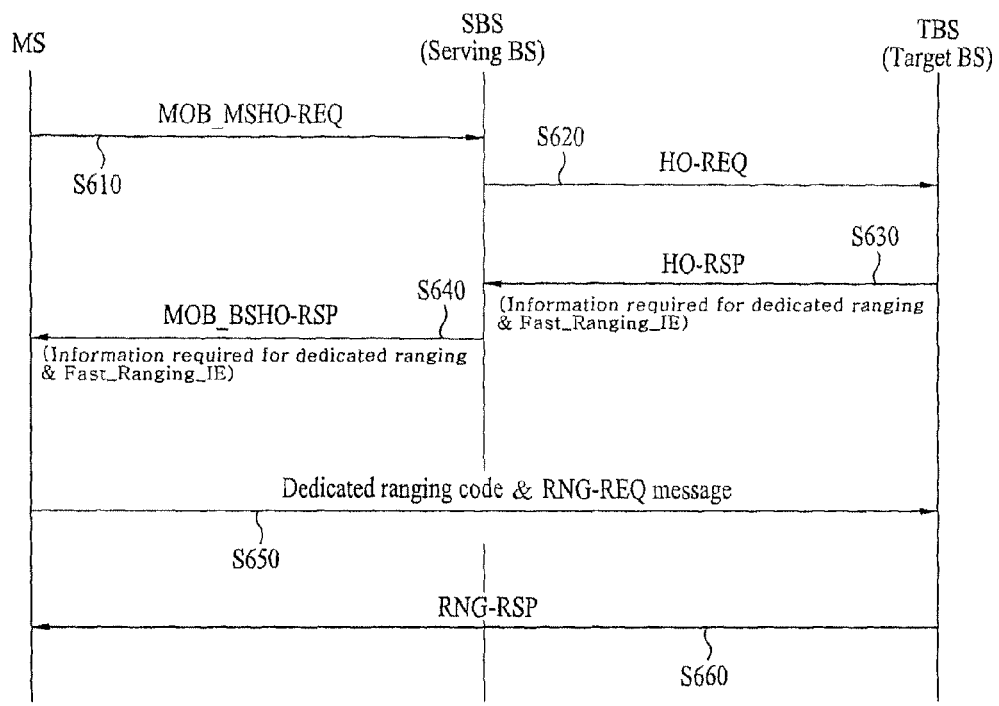
FIG. 6A and FIG. 6B are flowcharts for a fast handover procedure of a mobile station according to a second embodiment of the present invention.

FIG. 6A is a flowchart for a fast handover procedure by a handover request of a mobile station (MS initiated) according to a second embodiment of the present invention.

Referring to FIG. 6A, a mobile station may transmit a handover request message (MOB_MSHO-REQ) to a serving base station [S610].

Accordingly, the serving base station may exchange information on handover with at least one or more target base stations via backbone network. In particular, the serving base station may transmit a handover request (HO-REQ) message to the at least one target base station [S620].

Having received the request message, the target base station may transmit information required for the dedicated ranging, which will be used for the handover of the mobile station, and fast ranging information element (Fast_Ranging_IE) to the serving base station in a manner of sending a handover response message (HO-RSP) including the information required for the dedicated ranging and the fast ranging information element (Fast_Ranging_IE) [S630]. In this case, the information required for the dedicated ranging can include information on a dedicated ranging code index, information on a transmission opportunity (TXOP), and information on a frame timing for allocating a dedicated ranging region to an uplink of the target base station. Moreover, as mentioned in the foregoing description, the fast ranging information element (Fast_Ranging_IE) can include uplink allocation information to know uplink allocation information for the mobile station to transmit the ranging request message (RNG-REQ) to the target base station.

Subsequently, the serving base station may transmit the information required for the dedicated ranging and the fast ranging information element (Fast_Ranging_IE), which were received from the target base station, to the mobile station via a handover response message (MOB_BSHO-RSP) [S640].

The mobile station may perform the dedicated ranging on the target base station using the information required for the dedicated ranging within the handover response message. In particular, the mobile station may transmit the dedicated ranging code, which was received via the handover response message, to the target base station. Simultaneously, the mobile station may perform the fast ranging by transmitting a ranging request message (RNG-REQ) to the target base station according to the estimated TA information using the received fast ranging information element [S650].

In this case, operations of the base station and the mobile station are subdivided according to the results of the fast ranging and the dedicated ranging and a presence or non-presence of application of hybrid-automatic retransmission request (hereinafter abbreviated HARQ).

First of all, if the reception of the ranging request message (RNG-REQ) sent by the fast ranging is successfully performed by the target base station, the base station may send a ranging response message (RNG-RSP) to the mobile station [S660]. In particular, if the reception of the ranging request message (RNG-REQ) is successful, the same following procedure of the conventional fast ranging may be performed. And, it is unnecessary to send a response message for the dedicated ranging code.

Secondly, if the target base station fails in the reception of the ranging request message (RNG-REQ) sent by the fast ranging, a case of the non-presence of the application of the HARQ for the request message is explained as follows. In this case, the same following procedure of a general dedicated ranging may be executed. In particular, the target base station having received the dedicated ranging code transmits uplink (UP) parameter information to the mobile station via a corresponding response message (RNG-RSP).

The mobile station receives the uplink information, finishes the corresponding setup, and sends a ranging request message (RNG-REQ) to the target base station. The target base station finishes the handover procedure by transmitting a corresponding response (RNG-RSP) to the mobile station again.

Thirdly, if the target base station fails in the reception of the ranging request message (RNG-REQ) sent by the fast ranging, a case of the presence of the application of the HARQ for the request message is explained with reference to FIG. 7 and FIG. 8 as follows.

Figure 7:
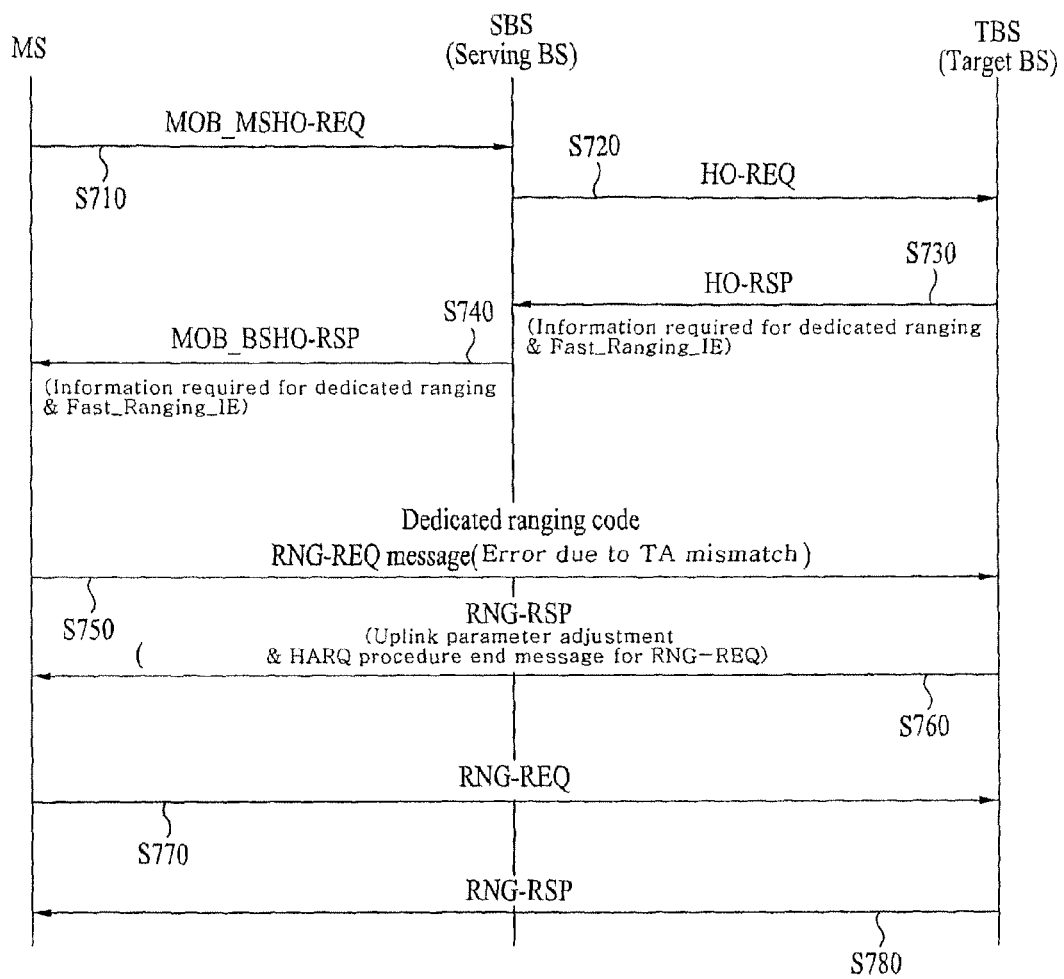
FIG. 7 is a flowcharts for a handover procedure in case that a transmission of a ranging request message (RNG-REQ) fails due to erroneous TA information, in a fast handover procedure by a handover request of a mobile station according to a second embodiment of the present invention.

FIG. 7 is a flowcharts for a handover procedure in case that a transmission of a ranging request message (RNG-REQ) fails due to a TA information error, in a fast handover procedure by a handover request of a mobile station according to a second embodiment of the present invention.

Referring to FIG. 7, steps S710 to S740 shown in FIG. 7 are identical to the former steps S610 to S640 shown in FIG. 6A.

Yet, a ranging request message (RNG-REQ) for fast ranging fails to be received by the target base station due to error of TA information estimated by the mobile station [S750]. In this case, the target base station may discriminate whether the cause of the reception failure of the ranging request message (RNG-REQ) is error of TA information or channel error, using the result of the dedicated ranging. In particular, as the target base station knows the dedicated ranging code the mobile station will transmit, although the code itself is correctly received as the reception result of the dedicated ranging code, if the corresponding reception timing is misaligned, it is able to determine that the reception failure cause is the error of the TA information.

When the reception of the dedicated ranging code is erroneous, although the dedicated ranging code and its transmission timing are correct, if the reception of the ranging request message (RNG-REQ) is not successful, the target base station may determine that the reception failure cause is the channel error.

If the target base station recognizes that the reception failure cause is the error of the TA information, the target base station flushes the ranging request message (RNG-REQ), which was received from the mobile station, from a reception buffer irrespective of a presence or non-presence of NACK response and does no allocate a resource for retransmission. Instead, the target base station may transmit an adjustment value for the uplink (UL) parameter to the mobile station in a manner of sending a ranging response message (RNG-RSP) having the adjustment value contained therein [S760].

If the mobile station receives the ranging response message (RNG-RSP) from the target base station, the mobile station holds the ongoing HARQ procedure, generates a new HARQ procedure by adjusting an uplink parameter according to the response message, and then may retransmit a ranging request message [S770].

For this, a prescribed indication field, which plays a role in informing the mobile station to perform an action for holding a currently executed specific HARQ procedure, may be created in the ranging response message. Having received the ranging request message containing the adjusted uplink parameter may end the handover procedure by sending a ranging response message to the mobile station [S780].

A case for the target base station to determine that the reception of the ranging request message (RNG-REQ) fails due to channel error is explained with reference to FIG. 8.

Figure 8:
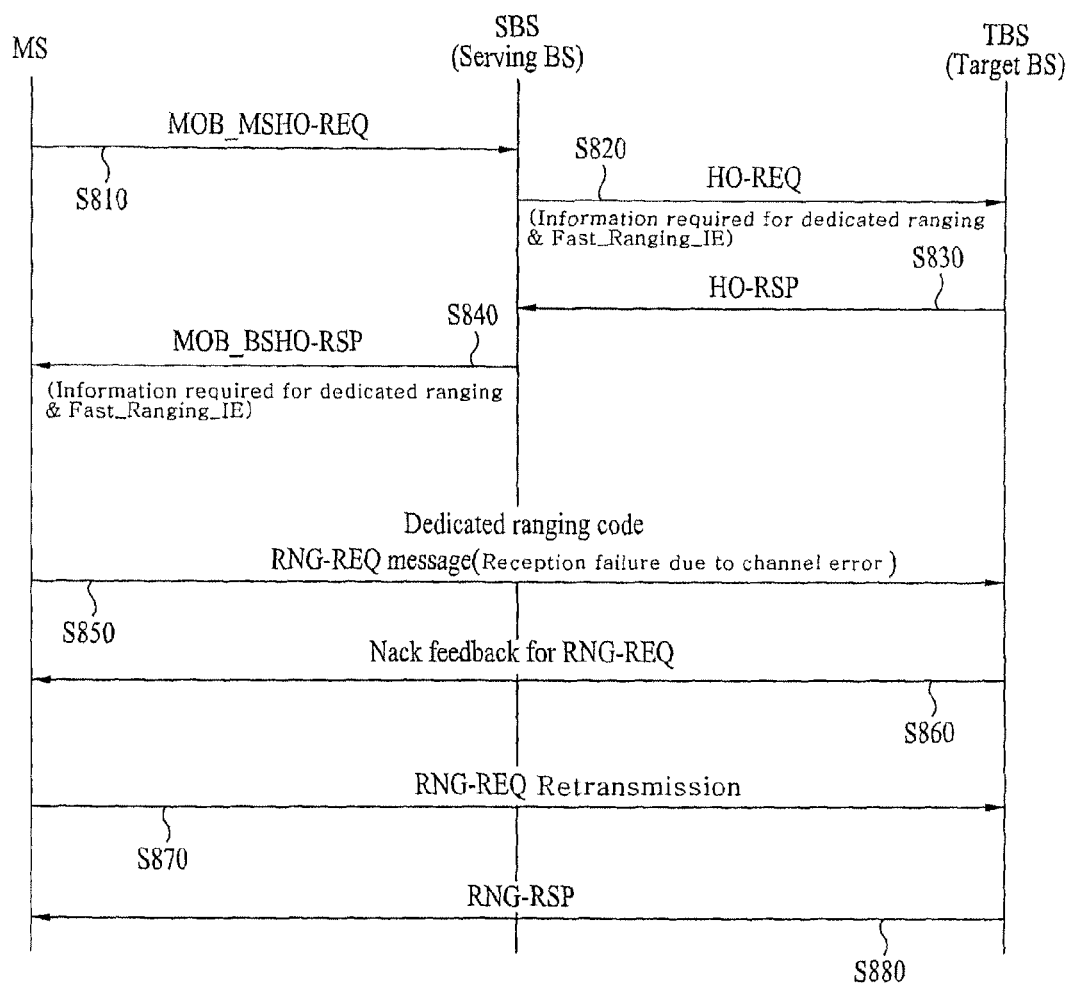
FIG. 8 is a flowcharts for a handover procedure in case that a transmission of a ranging request message (RNG-REQ) fails due to a channel error, in a fast handover procedure by a handover request of a mobile station according to a second embodiment of the present invention.

FIG. 8 is a flowcharts for a handover procedure in case that a transmission of a ranging request message (RNG-REQ) fails due to a channel error, in a fast handover procedure by a handover request of a mobile station according to a second embodiment of the present invention.

Referring to FIG. 8, steps S810 to S840 shown in FIG. 8 are identical to the former steps S610 to S640 shown in FIG. 6A.

Yet, due to channel error, the target base station fails in receiving the ranging request message (RNG-REQ) for the fast ranging [S850].

In case that the channel error is recognized as the cause of the reception failure, the target base station transmits NACK according to a following procedure of general HARQ [S860].

The mobile station is then able to retransmit the ranging request message (RNG-REQ) [S870].

Subsequently, the target base station ends the handover procedure by sending a ranging response message (RNG-RSP) to the mobile station [S880]. In this case, the target base station may not separately send a response message in response to the dedicated ranging code transmission of the mobile station.

The present embodiment is applicable to fast handover according to a request made not by a mobile station but by a base station (BS-initiated). This is explained in detail with reference to FIG. 6B.

Figure 6B:
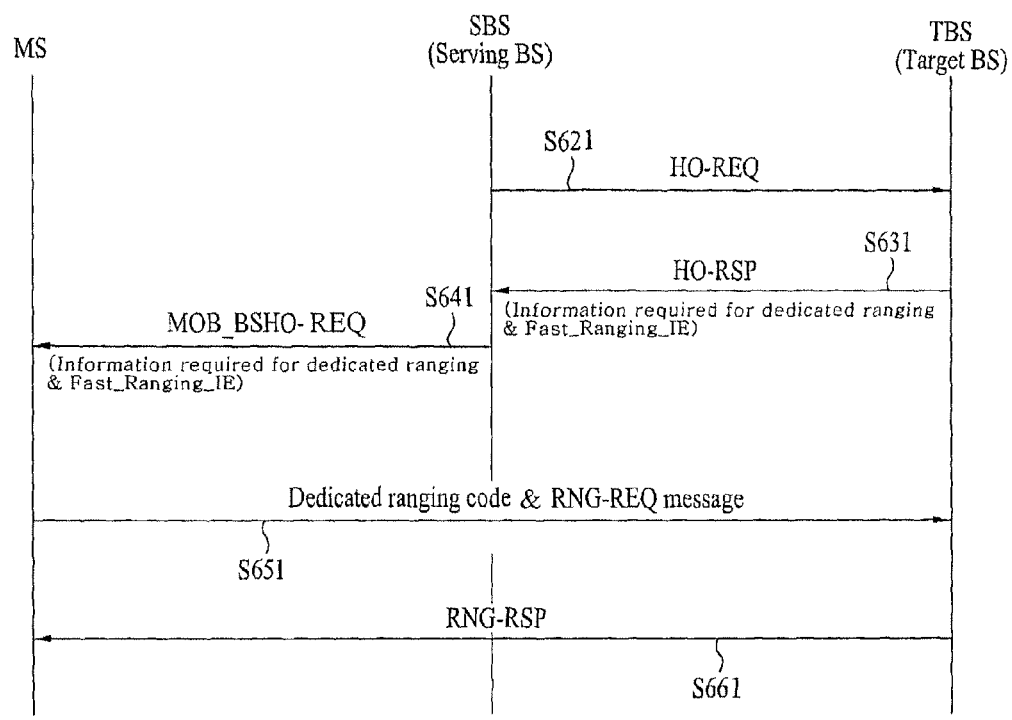

FIG. 6B is a flowchart for a fast handover procedure by a handover request of a base station (BS-initiated) according to a second embodiment of the present invention.

This handover differs from the former fast handover initiated by a request of a mobile station in that information request for dedicated ranging and fast ranging information element Fast_Ranging_IE, which will be used for handover of the mobile station, are transmitted to the mobile station not via a handover response message (MOB_BSHO-RSP) from a serving base station but via a handover request message (MOB_BSHO-REQ) [S641].

Moreover, a handover procedure is initiated by a request made by a base station. Therefore, this differs in omitting the step S610 of transceiving a handover request message (MOB_MSHO-REQ) of a mobile station prior to the step S621.

Thus, by a method of using dedicated ranging and fast ranging both, it is able to reduce additional delay attributed to code collision. Moreover, in case that a reception of a ranging request message for fast ranging in a target base station fails, it is able to reduce latency generated from performing contention-based handover ranging. Besides, even if HARQ is applied to the reception of the ranging request message (RNG-REQ) for the fast ranging, it is able to optimize latency by performing adaptive action according to discrimination of channel error and TA error.

Third Embodiment

When a mobile station performs fast handover, a third embodiment of the present provides a method of performing dedicated ranging together at the same time. Yet, the third embodiment differs from the second embodiment in contents carried over a handover response message (MOB_BS-RSP) or a handover request message (MOB_BSHO-REQ). In particular, timing information enabling a mobile station to receive information requested for dedicated ranging and fast ranging information element (Fast_Ranging_IE) from a target base station is carried by the messages.

Figure 9A:
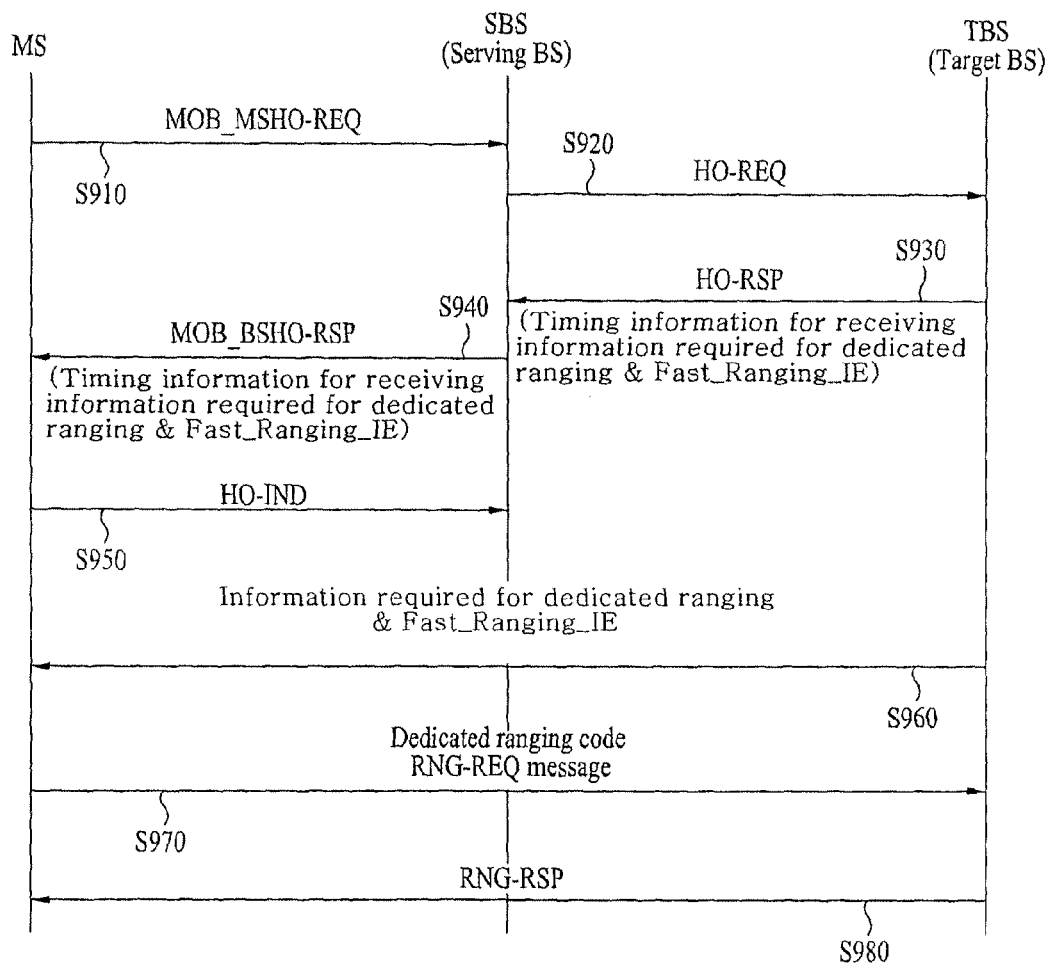
FIG. 9A and FIG. 9B are flowcharts for a fast handover procedure of a mobile station according to a third embodiment of the present invention.

FIG. 9A is a flowchart for a fast handover procedure by a handover request of a mobile station (MS-initiated) according to a second embodiment of the present invention.

Referring to FIG. 9A, a mobile station may transmit a handover request message (MOB_MSHO-REQ) to a serving base station [S910].

Accordingly, the serving base station may exchange information on handover with at least one or more target base stations via backbone network. For this, the serving base station may transmit a handover request (HO-REQ) message to the at least one available target base station [S920].

Having received the request, timing information for transmitting information required for dedicated ranging and fast ranging information element (Fast_Ranging_IE), which will be used for handover of the mobile station, to the mobile station can be transmitted to the serving base station in a manner that a handover request message having the timing information contained therein is transmitted to the serving base station [S930].

Subsequently, the serving base station may transmit the timing information received from the target base station to the mobile station via a handover response message (MOB_BSHO-RSP) [S940]. In this case, the timing information can be transmitted to the mobile station via an action time field of the handover response message (MOB_BSHO-RSP).

In case of determining handover to the target base station, the mobile station having received the timing information transmits a handover indication (MOB_HO-IND) message to the serving base station [S950]. Having received the handover indication, the serving base station may inform the target base station of the handover indication message via the backbone network.

Therefore, the target base station may transmit the information requested for the dedicated ranging and the fast ranging information element (Fast_Ranging_IE) to the mobile station in a frame indicated by the timing information. The mobile station receives the information requested for the dedicated ranging and the fast ranging information element (Fast_Ranging_IE) and is then able to obtain a dedicated ranging code, uplink allocation information for transmitting the dedicated ranging code and uplink allocation information for transmitting a ranging request message (RNG-REQ) for the fast ranging [S960].

In this case, the information required for the dedicated ranging can include a dedicated ranging code index, a transmission opportunity (TXOP) and a frame timing for allocating a dedicated ranging region to an uplink of the target base station.

The mobile station may transmit the dedicated ranging code to the target base station at the frame timing for allocating the dedicated ranging region to the uplink of the target base station. Moreover, the mobile station may transmit a ranging request message (RNG-REQ) for the fast ranging according to estimated TA information [S970].

In this case, as mentioned in the foregoing description of the second embodiment, operations of the base station and the mobile station are subdivided according to the results of the fast ranging and the dedicated ranging and a presence or non-presence of application of HARQ.

First of all, if the reception of the ranging request message (RNG-REQ) sent by the fast ranging is successfully performed by the target base station, the base station sends a ranging response message (RNG-RSP) to the mobile station [S980]. In particular, if the reception of the ranging request message (RNG-REQ) is successful, the same following procedure of the conventional fast ranging is performed. And, it is unnecessary to send a response message for the dedicated ranging code.

Secondly, if the target base station fails in the reception of the ranging request message (RNG-REQ) sent by the fast ranging, a case of the non-presence of the application of the HARQ for the request message is explained as follows. In this case, the same following procedure of a general dedicated ranging may be executed. In particular, the target base station having received the dedicated ranging code transmits uplink (UP) parameter information to the mobile station via a corresponding response message (RNG-RSP).

The mobile station receives the uplink information, finishes the corresponding setup, and sends a ranging request message (RNG-REQ) to the target base station. The target base station finishes the handover procedure by transmitting a corresponding response (RNG-RSP) to the mobile station again.

Thirdly, if the target base station fails in the reception of the ranging request message (RNG-REQ) sent by the fast ranging, a case of the presence of the application of the HARQ for the request message is explained with reference to FIG. 10 and FIG. 11 as follows.

Figure 10:
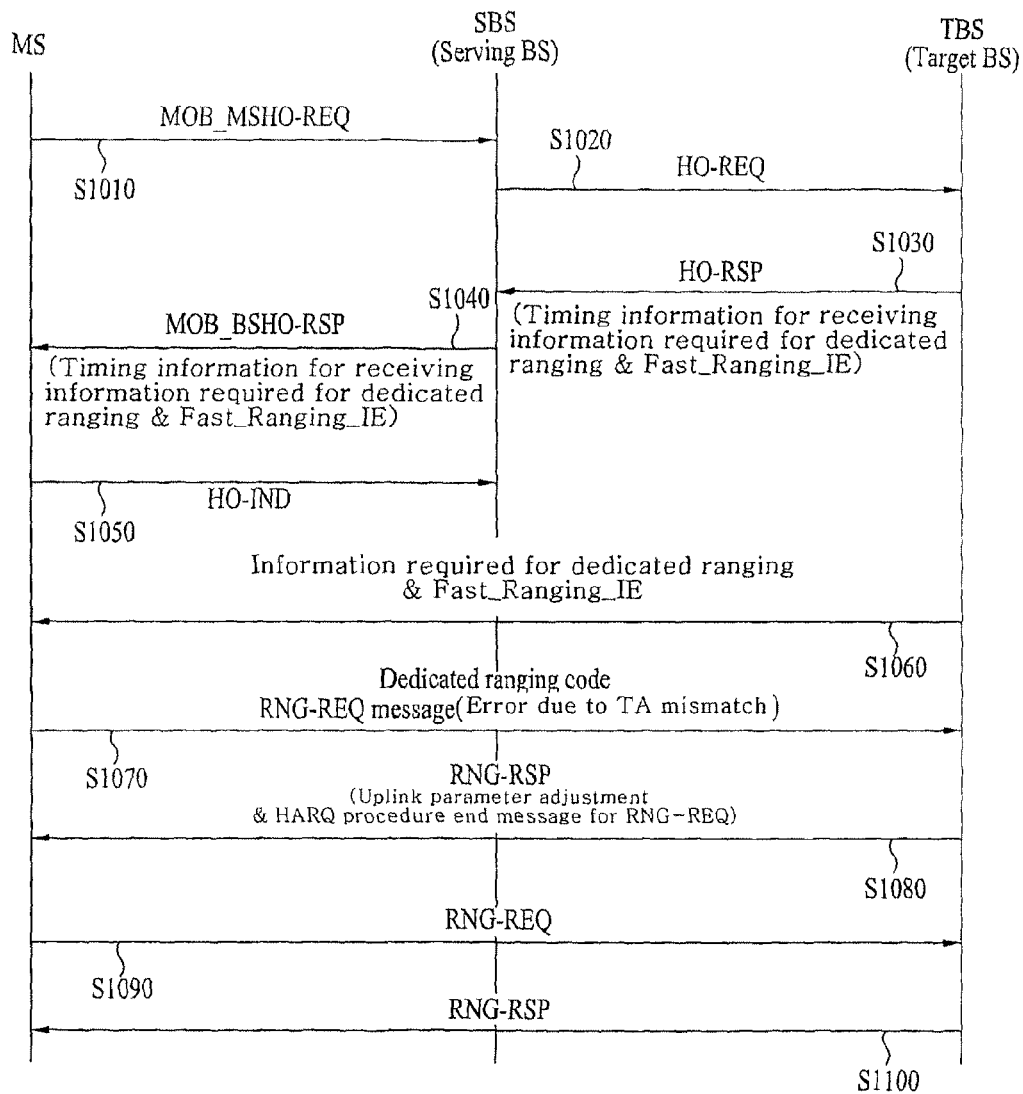
FIG. 10 is a flowcharts for a handover procedure in case that a transmission of a ranging request message (RNG-REQ) fails due to erroneous TA information, in a fast handover procedure by a handover request of a mobile station according to a third embodiment of the present invention.

FIG. 10 is a flowcharts for a handover procedure in case that a transmission of a ranging request message (RNG-REQ) fails due to erroneous TA information, in a fast handover procedure by a handover request of a mobile station according to a third embodiment of the present invention.

Referring to FIG. 10, steps S1010 to S1060 shown in FIG. 10 are identical to the former steps S910 to S940 shown in FIG. 9A.

Yet, a ranging request message (RNG-REQ) for fast ranging fails to be received by the target base station due to error of TA information estimated by the mobile station [S1070]. In this case, as mentioned in the foregoing description of the second embodiment, the target base station may discriminate whether the cause of the reception failure of the ranging request message (RNG-REQ) is error of TA information or channel error, using the result of the dedicated ranging. Since following steps S1080 to S1100 are identical to the steps S760 to S780 explained in the foregoing description of the second embodiment, descriptions of them are omitted for clarity of this disclosure.

A case for the target base station to determine that the reception of the ranging request message (RNG-REQ) fails due to channel error is explained with reference to FIG. 11.

Figure 11:
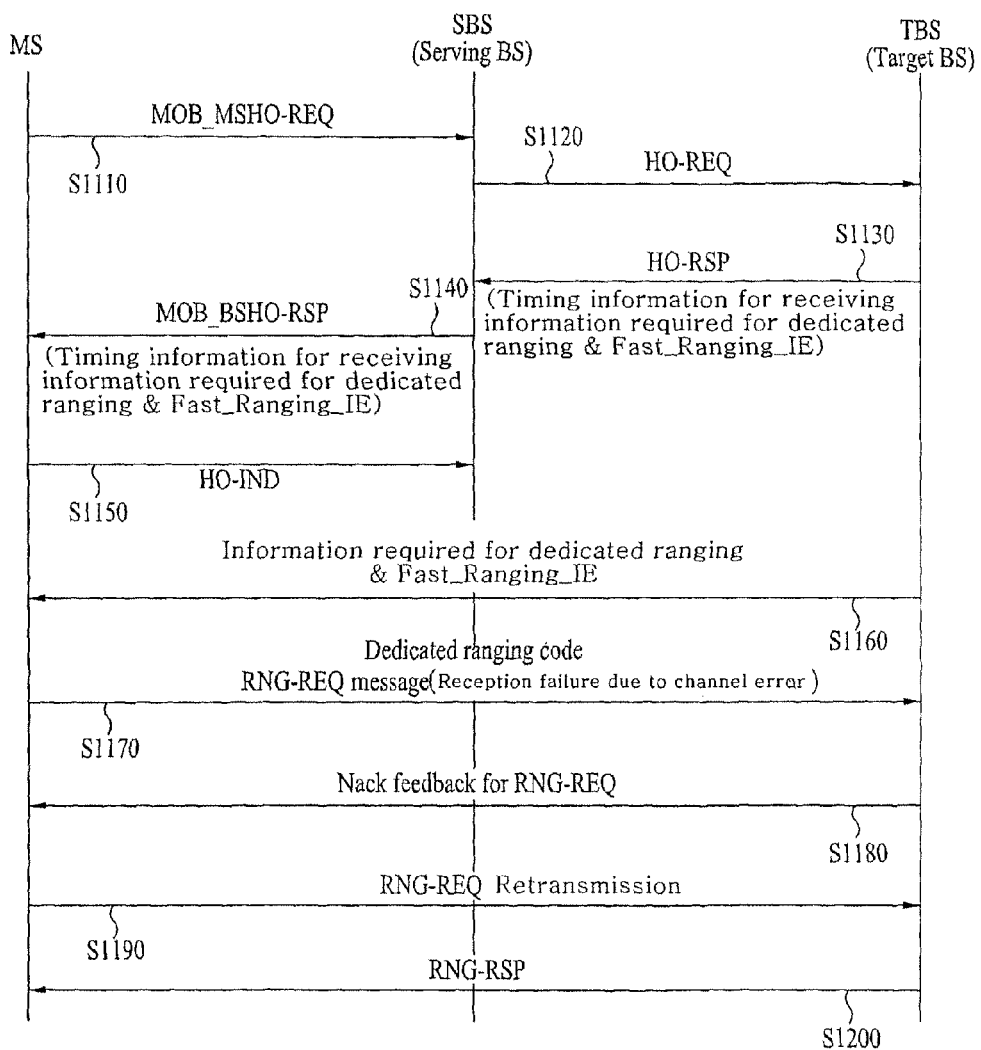
FIG. 11 is a flowcharts for a handover procedure in case that a transmission of a ranging request message (RNG-REQ) fails due to a channel error, in a fast handover procedure by a handover request of a mobile station according to a third embodiment of the present invention.

FIG. 11 is a flowcharts for a handover procedure in case that a transmission of a ranging request message (RNG-REQ) fails due to a channel error, in a fast handover procedure by a handover request of a mobile station according to a third embodiment of the present invention.

Referring to FIG. 11, steps S1110 to S1160 shown in FIG. 11 are identical to the former steps S910 to S960 shown in FIG. 9A.

Yet, due to channel error, the target base station fails in receiving the ranging request message (RNG-REQ) for the fast ranging [S1170]. Since following steps S1180 to S1200 are identical to the steps S860 to S880 explained in the foregoing description of the second embodiment, descriptions of them are omitted for clarity of this disclosure.

The present embodiment is applicable to fast handover according to a request made not by a mobile station but by a base station (BS-initiated). This is explained in detail with reference to FIG. 9B.

Figure 9B:
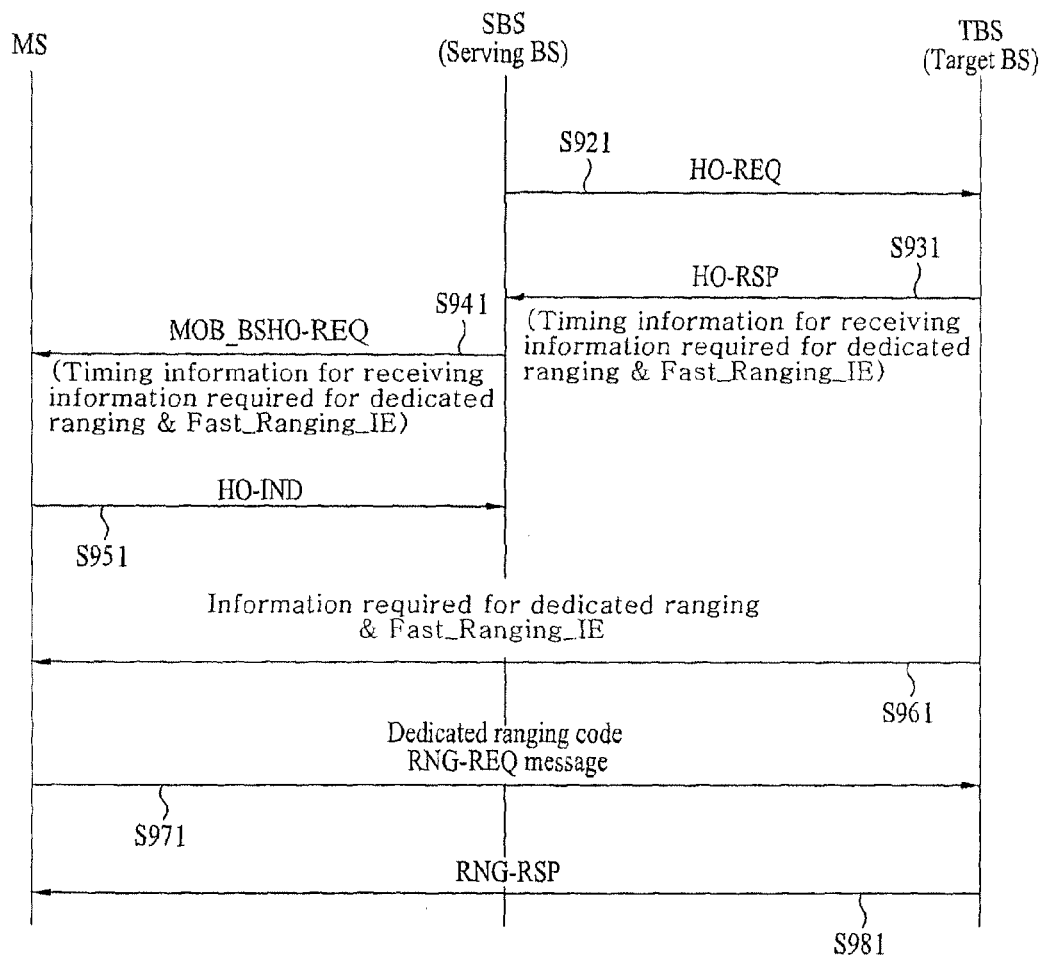

FIG. 9B is a flowchart for a fast handover procedure by a handover request of a base station (BS-initiated) according to a third embodiment of the present invention.

This handover differs from the former fast handover by a request of a mobile station in that timing information for a mobile station to receive the information requested for the dedicated ranging and the fast ranging information element Fast_Ranging_IE) is transmitted to the mobile station not via a handover response message (MOB_BSHO-RSP) from a serving base station but via a handover request message (MOB_BSHO-REQ) [S941].

Moreover, a handover procedure is initiated by a request made by a base station. Therefore, this differs in omitting the step S910 of transceiving a handover request message (MOB_MSHO-REQ) of a mobile station prior to the step S921.

Thus, by a method of using dedicated ranging and fast ranging both, it is able to reduce additional delay attributed to code collision. Moreover, in case that a reception of a ranging request message for fast ranging in a target base station fails, it is able to reduce latency generated from performing contention-based handover ranging. Besides, even if HARQ is applied to the reception of the ranging request message (RNG-REQ) for the fast ranging, it is able to optimize latency by performing adaptive action according to discrimination of channel error and TA error.

INDUSTRIAL APPLICABILITY

Accordingly, embodiments of the present invention are applicable to various wireless access systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of performing handover, which is performed by a mobile station, the method comprising the steps of:
    receiving a handover message including a specific ranging code and uplink resource information from a serving base station; and
    transmitting the specific ranging code to a target base station using the uplink resource information,
    wherein the specific ranging code and the uplink resource are allocated for the mobile station only by the target base station; and
    Wherein the handover message is either a handover response message (MOB_BSHO-RSP) of the serving base station for a handover request message of the mobile station or a handover request message (MOB_BSHO-REQ) of the serving base station for the mobile station.

2. The method according to claim 1, wherein the uplink resource information comprises at least one selected from the group comprising time information and frequency information on an uplink resource required for the mobile station to transmit the specific ranging code to the target base station.

3. The method according to claim 2, wherein the handover message further includes an action time field and wherein the step of transmitting the specific ranging code to the target base station from the mobile station is performed in a frame indicated by the action time field included in the handover message.

4. A method of supporting handover of a mobile station, which is performed by a serving base station, the method comprising the steps of:

transmitting a handover request (HO-REQ) to at least one target base station;

receiving a handover response (HO-RSP) including a specific ranging code and uplink resource information from the at least one target base station; and transmitting a handover message including the specific ranging code and the uplink resource information to the mobile station, wherein the specific ranging code and the uplink resource are allocated to the mobile station only by each of the at least one target base station; and Wherein the handover message is either a handover response message (MOB_BSHO-RSP) of the serving base station for a handover request message of the mobile station or a handover request message (MOB_B-SHO-REQ) of the serving base station for the mobile station.

5. A method of performing handover, which is performed by a mobile station, the method comprising the steps of:

receiving a handover message including information required for dedicated ranging and fast ranging information element (Fast_Ranging_IE) from a serving base station; and transmitting a dedicated ranging code and a ranging request message for fast ranging to a target base station; and Wherein the handover message is either a handover response message (MOB_BSHO-RSP) of the serving base station for a handover request message of the mobile station or a handover request message (MOB_B-SHO-REQ) of the serving base station for the mobile station.

6. The method according to claim 5, wherein the information required for the dedicated ranging includes at least one selected from the group comprising a dedicated ranging code index, a transmission opportunity and a frame timing for allocating a dedicated ranging region to an uplink of the target base station.

7. The method according to claim 5, further comprising the step of:

if the target base station determines that the ranging request message is not received due to channel error as a result of receiving the dedicated ranging code and if non-acknowledgement (NACK) is received from the target base station, retransmitting a ranging request message to the target base station.

8. The method according to claim 5, further comprising the steps of:

if the target base station determines that the ranging request message is not received due to error of TA (time alignment) information as a result of receiving the dedicated ranging code, receiving a ranging response message including uplink parameter amendment information from the target base station;

amending an uplink parameter using the uplink parameter amendment information; and retransmitting a ranging request message to the target base station.

9. A method of supporting handover of a mobile station, which is performed by a serving base station, the method comprising the steps of:

transmitting a handover request (HO-REQ) to at least one target base station;

receiving a handover response (HO-RSP) including information required for dedicated ranging and fast ranging information element (Fast_Ranging_IE) from the at least one target base station; and transmitting a handover message including the information required for the dedicated ranging and the fast ranging information element (Fast_Ranging_IE) to the mobile station.

10. The method according to claim 9, wherein the information required for the dedicated ranging includes at least one selected from the group comprising a dedicated ranging code index, a transmission opportunity and a frame timing for allocating a dedicated ranging region to an uplink of the target base station.

11. A method of performing handover, which is performed by a mobile station, the method comprising the steps of:

receiving a handover message including timing information for receiving information required for dedicated ranging and fast ranging information element (Fast_Ranging_IE) from a target base station from a serving base station;

transmitting a handover indication (HO-IND) message for the target base station to the serving base station and receiving the information required for the dedicated ranging and the fast ranging information element (Fast_Ranging_IE) from the target base station using the received timing information; and transmitting a dedicated ranging code for the dedicated ranging and a ranging request message for fast ranging to the target base station; and Wherein the handover message is either a handover response message (MOB_BSHO-RSP) of the serving base station for a handover request message of the mobile station or a handover request message (MOB_BSHO-REQ) of the serving base station for the mobile station.

12. The method according to claim 11, wherein the handover message further includes an action time field and wherein the timing information for receiving the information required for the dedicated ranging and the fast ranging information element (Fast_Ranging_IE) is transmitted to the mobile station using the action time field of the handover message.

13. The method according to claim 11, wherein the information required for the dedicated ranging includes at least one selected from the group comprising a dedicated ranging code index, a transmission opportunity and a frame timing for allocating a dedicated ranging region to an uplink of the target base station.

14. The method according to claim 11, further comprising the step of if the target base station determines that the ranging request message is not received due to channel error as a result of receiving the dedicated ranging code and if non-acknowledgement (NACK) is received from the target base station, retransmitting a ranging request message to the target base station.

15. The method according to claim 11, further comprising the steps of:

if the target base station determines that the ranging request message is not received due to error of TA (time alignment) information as a result of receiving the dedicated ranging code, receiving a ranging response message including uplink parameter amendment information from the target base station;

amending an uplink parameter using the ranging response message; and retransmitting a ranging request message to the target base station.

* * * * *